United States Patent
Kawata (10) Patent No.: US 7,633,469 B2
(45) Date of Patent: Dec. 15, 2009

(54) ELECTRO-OPTICAL DEVICE SUBSTRATE, ELECTRO-OPTICAL DEVICE, AND TESTING METHOD

(75) Inventor: Hirotaka Kawata, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1085 days.

(21) Appl. No.: 11/201,179

(22) Filed: Aug. 11, 2005

(65) Prior Publication Data

US 2006/0060851 A1    Mar. 23, 2006

(30) Foreign Application Priority Data

Sep. 22, 2004    (JP)    ............................. 2004-274659

(51) Int. Cl.
*H01L 29/04* (2006.01)
(52) U.S. Cl. .......................................... 345/76; 257/59
(58) Field of Classification Search ................... 345/76, 345/88, 212; 257/59; 324/770, 763, 753
See application file for complete search history.

(56) References Cited

U.S. PATENT DOCUMENTS

| | | | |
|---|---|---|---|
| 6,172,410 B1 | 1/2001 | Nagata et al. | |
| 6,677,171 B1 | 1/2004 | Nagata et al. | |
| 7,233,155 B2 * | 6/2007 | Fujita | 324/753 |
| 2004/0174183 A1 | 9/2004 | Nojiri et al. | |
| 2005/0110727 A1 * | 5/2005 | Shin | 345/76 |
| 2006/0038580 A1 * | 2/2006 | Hasegawa et al. | 324/770 |

FOREIGN PATENT DOCUMENTS

| | | |
|---|---|---|
| JP | A-64-084297 | 3/1989 |
| JP | A-09-113562 | 5/1997 |
| JP | A-10-123574 | 5/1998 |
| JP | 10-260391 | 9/1998 |
| JP | A 2000-029067 | 1/2000 |
| JP | A-2002-090424 | 3/2002 |
| JP | A-2002-116453 | 4/2002 |
| JP | A 2002-296620 | 10/2002 |
| KR | A 2000-0007737 | 2/2000 |
| KR | A 2000-0011657 | 2/2000 |
| KR | A 2002-0077033 | 10/2002 |
| KR | A 10-2004-0062030 | 7/2004 |
| TW | 559684 | 11/2003 |

* cited by examiner

*Primary Examiner*—Amare Mengistu
*Assistant Examiner*—Yuk Chow
(74) *Attorney, Agent, or Firm*—Oliff & Berridge PLC (57) ABSTRACT

An electro-optical device substrate has substrate devices, each composed of at least a portion of an electro-optical device having an image display region, on a surface thereof, and is divided into the substrate devices along boundaries between regions where the substrate devices are formed. The electro-optical device substrate includes testing wiring lines which are provided in regions other than the substrate device forming regions on the substrate, and which are respectively supplied with testing signals for the substrate devices, two or more image signal terminals being electrically connected to each testing wiring line.

12 Claims, 8 Drawing Sheets

ELECTRO-OPTICAL DEVICE SUBSTRATE, ELECTRO-OPTICAL DEVICE, AND TESTING METHOD

This application claims the benefit of Japanese Patent Application No. 2004-274659 filed on Sep. 22, 2004. The entire disclosure of the prior application is hereby incorporated by reference herein in its entirety.

BACKGROUND OF THE INVENTION

1. Technical Field

The present invention relates to an electro-optical device substrate used for manufacturing an electro-optical device, such as a liquid crystal device, and to an electro-optical device manufactured using the electro-optical device substrate. In addition, the present invention relates to a method of testing the electro-optical device.

2. Related Art

In general, this type of electro-optical device includes an electro-optical panel for displaying images and a driving circuit. The driving circuit is mounted on a substrate having an electro-optical panel thereon.

The electro-optical device (including the driving circuit when the driving circuit is mounted therein) is generally tested to detect defects, for example, during manufacture, after manufacture, prior to shipping, when the device is examined after use, and when the device is out of order. For example, the electro-optical device is driven in an incomplete state, such as before mounting the driving circuit, or in the state of an electro-optical panel to display a testing image, and then the testing is performed based on the suitability of the testing image. Alternatively, a testing circuit is incorporated into the electro-optical device, and signals of the testing circuit are monitored when driving the device, thereby testing the electro-optical device (see Japanese Unexamined Patent Application Publication No. 10-260391).

However, in the electro-optical device employing, for example, a multiplex method, which is called a hybrid type, it is difficult to perform the testing because the structure of the device becomes complicated.

More specially, in the hybrid-type electro-optical device, a plurality of image signals corresponding to a plurality of data lines in the electro-optical panel are supplied from an external driving circuit. Also, the electro-optical device is driven in the following multiplex method. That is, the image signals are input to each pixel unit of the electro-optical panel, and the input image signals are time-divided into R (red), G (green), and B (blue) components by a demultiplexer. Then, the components are input to three data lines corresponding to three dots constituting one pixel, respectively.

In this case, the number of image signal terminals to which the image signals are input from the outside should be at least a third of the number of the data lines (that is, the number of pixels in the horizontal direction). That is, in the hybrid-type electro-optical panel, in general, the number of image signal terminals is up to several hundreds.

The number of image signal terminals of the hybrid-type electro-optical panel is considerably larger than the number of image signal terminals of an electro-optical device which is driven by so-called serial-parallel expansion (that is, phase expansion). In the serial-parallel expansion, since each group of L data lines is simultaneously driven by the image signals supplied from L image signal lines (for example, 6, 12, or 24 image signal lines), L image signal terminals are required. That is, several or several tens of image signal terminals are required at most.

In the hybrid-type electro-optical device, the number of image signal terminals is relatively large, and gaps between the image signal terminals are relatively narrow. Thus, when the above-mentioned test is performed by bringing a probe into contact with the image signal terminals, the probe should be positioned with high precision. As a result, it is difficult to perform the test with high accuracy, which results in a low degree of manufacturing efficiency and an increase in testing costs.

SUMMARY

An advantage of the invention is that it provides an electro-optical device substrate and an electro-optical device capable of simply performing a test for detecting defects, and another advantage of the invention is that it provides a simple testing method applicable to the electro-optical device substrate.

According to an aspect of the invention, an electro-optical device substrate has substrate devices, each composed of at least a portion of an electro-optical device having an image display region, on a surface thereof, and is divided into the substrate devices along boundaries between regions where the substrate devices are formed. The electro-optical device substrate includes a plurality of data line groups each of which is composed of n (where n is a natural number equal to or greater than 2) data lines, and which are formed in the image display region of each substrate device forming region; a plurality of image signal terminals which are formed in a peripheral region of the image display region of each substrate device forming region to correspond to the plurality of data line groups, respectively, and which are respectively supplied with multiplex signals of the data line groups obtained by multiplexing n types of image signals along a time axis; a demultiplexer which is formed in the peripheral region of the image display region in each substrate device forming region, and which demultiplexes the multiplex signals input through the plurality of image signal terminals according to selection signals to generate and output the n types of image signals to the n data lines, respectively; driving signal terminals which are formed in the peripheral region of the image display region in each substrate device forming region, and which are supplied with driving signals including the selection signals; and testing wiring lines which are provided in regions other than the substrate device forming regions on the substrate, and which are respectively supplied with testing signals for the substrate devices, two or more image signal terminals being electrically connected to each testing wiring line.

According to the electro-optical device substrate of the invention, the substrate device for the electro-optical device employing a hybrid-type multiplex method is formed in each substrate device forming region. That is, each substrate device is provided with the plurality of image signal terminals which are formed in the peripheral region of the image display region to respectively correspond to the data line groups, the demultiplexer that demultiplexes the signals supplied through the image signal terminals to output the multiplexed signals to the data lines, and one or more driving signal terminals that supply the driving signals including the selection signals to be supplied to the demultiplexer. The demultiplexer is a circuit element which time-divides (that is, demultiplexes) the multiplex signals obtained by multiplexing the n types of image signals along the time axis into n types (generally, three types of R (red), G (green), and B (blue)) of image signals and which outputs them to the n data lines, respectively, in the electro-optical panel or the electro-optical device manufactured from the substrate device. The multiplex signals are supplied from an external circuit which multiplexes n types of image signals to generate and output them to the demultiplexer.

Furthermore, the 'substrate device' of the invention means a device in which at least a portion of a driving circuit is provided in the inside or the outside of the electro-optical panel in a narrow sense, and means an unfinished or finished electro-optical panel having no driving circuit therein in a broad sense. This substrate device may have a single substrate structure in which pixel circuits are formed in the image display region on an electro-optical device substrate, which is a mother board, or have a structure in which a counter substrate is bonded thereto. In the invention, all substrate devices which can be tested by supplying the testing signals are considered as the substrate device, without depending on the narrow sense or the broad sense.

In general, a plurality of substrate devices is formed on an electro-optical device substrate having a relatively large size, which is called a mother board, and is manufactured by dividing the electro-optical device substrate into the forming regions. For example, first, notches are formed along boundaries of the forming regions on the electro-optical device substrate made of, for example, quarts or glass (scribe). Then, the substrate is cut by pressing the blade of a cutter against the notches. That is, the 'forming region' means a region to be divided or separated from the substrate as the substrate device or the electro-optical panel, rather than a region in which components of the substrate device are formed. In the above-mentioned structure, the forming region means the substrate device on the substrate defined by the scribe positions. Also, this substrate device may be formed on one substrate one by one.

Furthermore, the 'region other than each substrate device forming region' of the invention means a region other than the forming region of one substrate device, and may be a region where another substrate device is formed on the same substrate, or a region in which any substrate device is not formed, for example, a peripheral region of the mother board.

In the electro-optical device substrate of the invention, the testing wiring line for commonly and electrically connect two or more image signal terminals is formed in a region corresponding to the scribe space. Alternatively, the testing wiring line is formed in a region where the substrate device adjacent to one substrate device is formed. In the latter case, the scribe space may not be needed. In some cases, the testing wiring line extends in a direction in which the image signal terminals are arranged, and is connected to the image signal terminals by wiring lines formed to be laid across the boundaries between the forming regions.

Accordingly, in the related art, the testing signals are supplied by bringing a probe into contact with each image signal terminal in order to test the substrate device. On the contrary, in the invention, the testing signals can be collectively supplied to the image signal terminals through the testing wiring line. The number of testing wiring lines may be, for example, one. In this case, all image signal terminals may be commonly connected to one testing wiring line. Alternatively, the plurality of image signal terminals may be divided into several groups, and a plurality of testing wiring lines may be formed to be connected to each group of image signal terminals.

Accordingly, in the invention, the location precision required for the probe during the test can be reduced, which results in an increase in testing costs. In addition, the test can be simply and accurately performed. As mentioned above, the number of image signal terminals is relatively large in the hybrid-type substrate device formed on the electro-optical device substrate. Thereby, this structure has a higher degree of manufacturing efficiency than other structures.

Moreover, since the testing wiring line is formed in the scribe space, the test is performed before the electro-optical device substrate is divided. Since the testing wiring line is separated from the substrate device after the test, it is available only during the test, and does not affect the substrate device or the electro-optical panel after the test. Further, it is not necessary to secure a wiring space at the side of the substrate device or to change the layout. Also, when the testing wiring line is formed in a region in which a substrate device adjacent to the corresponding substrate device is formed, the testing wiring line is separated from the corresponding substrate device after the test. In this case, the testing wiring line may be formed in an empty space on the substrate, such as a side of each substrate device opposite to the side where the image signal terminals are arranged.

The substrate device may be tested according to the suitability of a test image displayed based on the testing signals. Alternatively, the substrate device may be tested by forming a testing circuit connected to the substrate device on the substrate and by monitoring signals from a predetermined portion of the testing circuit or the substrate device when the substrate device is driven based on the testing signal. Since the testing circuit is generally provided in the substrate device, in the former case, it is not necessary to secure a space required for the testing circuit, and to change the layout.

In the above-mentioned structure, it is preferable that the electro-optical device substrate further include a testing common terminal which is formed in the peripheral region to be electrically connected to the testing wiring line, so that it is supplied with the testing signals.

According to this structure, the testing common terminal is electrically connected to the testing wiring line. Therefore, the testing signals can be stably and surely supplied by bringing the probe into contact with the testing common terminal during the test.

The testing common terminal is, for example, formed in the peripheral region to be parallel to the image signal terminals. Therefore, when the electro-optical panels are divided so that the electrical connection between the image signal terminals and the testing wiring line is broken, the electrical connection between the testing common terminals and the testing wiring line is also broken. Also, since the testing common terminal may not be used after the testing, it may be formed in any empty space, without being limited to specific forming locations.

In the above-mentioned structure, it is preferable that the electro-optical device substrate further include a testing common terminal which is formed in the region other than the substrate device forming region to be electrically connected to the testing wiring line, so that it is supplied with the testing signals.

According to this structure, the testing common terminal is electrically connected to the testing wiring line. Therefore, the testing signals can be stably and surely supplied by bringing the probe into contact with the testing common terminal during the testing.

The testing common terminal is, for example, formed in the region other than the forming region of the electro-optical panel, that is, in the scribe space, similar to the testing wiring line. Therefore, when the electro-optical panels are divided, the electrical connection between the testing common terminals and the testing wiring line is broken.

In particular, in the this structure, a space for the testing common terminal is not formed in the forming region of the substrate device, and thus the layout design of the substrate device can be performed without considering the testing common terminal. For example, if the testing common terminal is provided in the peripheral region of the mother board which will be finally cut out, the space of the substrate plane can be efficiently used. Further, in the case in which a plurality of substrate devices are formed on one mother board in a matrix, if the testing common terminals are connected to the common testing wiring line to which the plurality of substrate devices are connected, the space can be more efficiently used.

In the above-mentioned structure, it is preferable that the size of the testing common terminal be larger than that of the image signal terminal on the substrate.

In this case, the size of the testing common terminal is increased by the size of a common portion of the image signal terminals, and thus the probe can be positioned with lower precision. Accordingly, the testing image signals can be more stably and surely supplied.

In the above-mentioned structure, it is preferable that the electro-optical device further include a guard ring which is formed in the region other than the substrate device forming region to be electrically connected to the testing wiring line through a high-resistance wiring line having a resistance value of larger than 1 MΩ.

According to this structure, the testing wiring line is directly electrically connected to the guard ring, or is electrically connected to the guard ring through, for example, the testing common terminal, and thus the image signal terminals which are commonly connected to the testing wiring line are electrically connected to the guard ring. The guard ring is a wiring line or a member which is provided to prevent an element formed on the electro-optical device substrate, such as a transistor, from being damaged by the convergence of an electric field generated when the substrate device is manufactured. This structure makes it possible to effectively prevent the transistors electrically connected to the image signal terminals from being damaged due to the static electricity generated from each process before the electro-optical device substrate is divided.

Moreover, the guard ring may be formed in the scribe space, similar to the testing wiring line. If the electrical connection between the testing wiring line and the image signal terminals is broken, the electrical connection between the testing common terminal and the image signal terminals is also broken. Thus, the guard ring may be formed in the side of the substrate device, particularly, in the peripheral region thereof.

In the above-mentioned structure, it is preferable that the driving signal terminals be electrically connected to the testing wiring line through high-resistance wiring lines having a resistance value of larger than 1 MΩ, respectively.

According to this structure, the driving terminals are electrically connected to testing wiring line through the high-reference wiring lines, respectively, and thus the testing wiring line functions as the guard ring. Accordingly, this structure makes it possible to effectively prevent the transistors electrically connected to the driving terminals from being damaged due to the static electricity generated from each process before the electro-optical device substrate is divided.

In the above-mentioned structure, it is preferable that the plurality of image signal terminals be divided into a plurality of groups, and that a plurality of testing wiring lines be formed to be electrically connected to the groups of image signal terminals, respectively.

According to this structure, the plurality of testing wiring lines are formed to respectively corresponding to the groups of image signal thermals, and thus the freedom of the pattern of the testing image displayed respond to the testing image signals can be improved.

In the above-mentioned structure, it is preferable that the testing wiring lines be electrically connected to a group of odd-numbered image signal terminals and a group of odd-numbered image signal terminals, respectively.

In this case, since the image signals are transmitted to the image signal terminals through two lines, the width of a display pattern becomes double. For example, if white display and black display are performed on the respective lines, a strip-shaped pattern can be displayed. On the other hand, if the number of lines is larger than two, a wiring structure or a testing signal pattern becomes complicated. However, if the number of lines is two, the above-mentioned problem does not arise.

In the above-mentioned structure, it is preferable that the substrate devices be arranged on the substrate, and that the testing wiring lines electrically connect the plurality of image signal terminals on the substrate devices, respectively.

According to this structure, the testing wiring line is electrically connected to the plurality of substrate devices formed on the same electro-optical device substrate, not only one substrate device. Therefore, the same test can be simultaneously performed on the plurality of substrate devices, which results in an improvement in manufacturing efficiency. Also, since the plurality of substrate devices are physically divided as separate chips, the common electrical connection due to the testing wiring line is broken, which does not raise any problem.

In the above-mentioned structure, it is preferable that the image display region of each substrate device forming region be provided with a plurality of scanning lines intersecting the data lines and a plurality of pixel units which are respectively provided corresponding to intersections of the data lines and the scanning lines, and that a scanning line driving circuit for outputting the scanning signals to the plurality of scanning lines be provided in the peripheral region.

According to this structure, the scanning signals are supplied to the pixel units through the scanning lines by the scanning line driving circuit which is incorporated into or is mounted on the substrate device during testing or driving. Simultaneously, the testing signals or the image signals are supplied through the image signal terminals by the testing device or the data line driving circuit, and thus the image signals are supplied to the pixel units. In this way, active matrix driving by a multiplex method can be performed during testing or driving.

According to another aspect of the invention, an electro-optical device includes the substrate device which is obtained by dividing the above-mentioned electro-optical device substrate (including the above-mentioned structures) along the boundaries between the substrate device forming regions; an image signal supplying unit that generates multiplex signals by multiplexing the n types of image signals along the time axis to supply them to the plurality of image signal terminals; and a driving signal supplying unit that supplies the driving signals to the driving signal terminals.

According to this structure, the electro-optical device is manufactured by mounting the driving circuit on the substrate device divided from the electro-optical device substrate. In other words, since the hybrid-type electro-optical device is manufactured by combining the electro-optical device substrate with the driving circuit, an operational test therefor can be simply and surely performed before the driving circuit is mounted.

The electro-optical device includes various devices, for example, a liquid crystal device, an organic electro-luminescent device, an electrophoresis device, such as an electronic paper, and display devices using electron emission elements (field emission display and surface-conduction electron-emitter display). Also, the electro-optical device can be applied to a projection display device, a television set, a cellular phone, an electronic organizer, a word processor, a viewfinder-type or monitor-direct-view-type videotape recorder, a workstation, a television telephone, a POS terminal, a touch panel, and image forming apparatuses, such as a printer, a copier, and a facsimile used as an exposure head.

According to still another aspect of the invention, there is provided a method of testing a substrate device which is applied to the electro-optical device substrate. The testing method includes supplying the testing signals to the image signal terminals through the testing wiring lines to drive the substrate devices; and performing the testing based on driving states of the substrate devices.

In the testing method according to the above-mentioned aspect, in the driving the substrate devices, the substrate device to be tested is driven on the electro-optical device substrate. That is, in the related art, the testing signals are supplied by bringing the probe into contact with the image signal terminals. However, in the invention, the testing signals are collectively supplied through the testing wiring line.

By using the testing wiring line, the location precision required for the testing probe can be reduced, and thus the testing signals can be simply and accurately supplied to the image signal terminals.

In the performing the testing, defects of the substrate device is tested based on, for example, the test images or the driving states reflected in the monitored signal waveforms.

Accordingly, in the testing method of the invention, the location precision required for the probe is not so high although the substrate device formed on the substrate is of a hybrid type, which makes it possible to prevent an increase in testing costs and to perform a simple, accurate test.

The operations and advantages of the invention can be apparently understood from the following embodiments.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, embodiments of the invention will be described with reference to the accompanying drawings. In the following embodiments, an electro-optical device according to the invention is applied to a liquid crystal device.

First Embodiment

A first embodiment of the invention will be described with reference to FIGS. 1 to 6.

Electro-Optical Device

The electro-optical device according to the present embodiment is of a hybrid type, and includes an electro-optical panel and a driving circuit mounted on the panel. The electro-optical panel is an example of a 'substrate device' in a broad sense. In the following embodiments, the substrate device during manufacture is referred to as an electro-optical panel, and a finished product is referred to as an electro-optical device.

Figure 1:
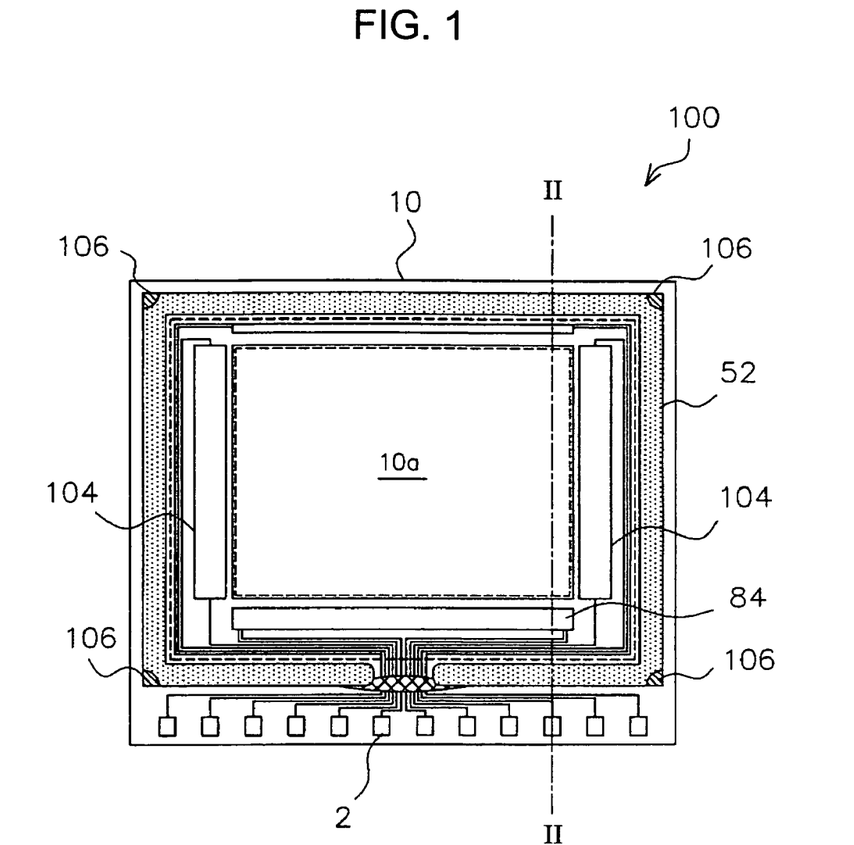
FIG. 1 is a plan view illustrating the overall structure of an electro-optical panel according to a first embodiment of the invention.
Figure 2:
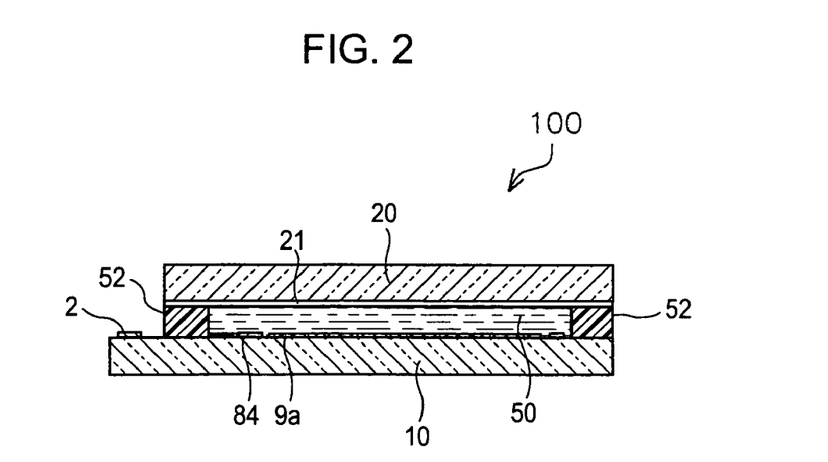
FIG. 2 is a cross-sectional view taken along the line II-II of FIG. 1.
Figure 3:
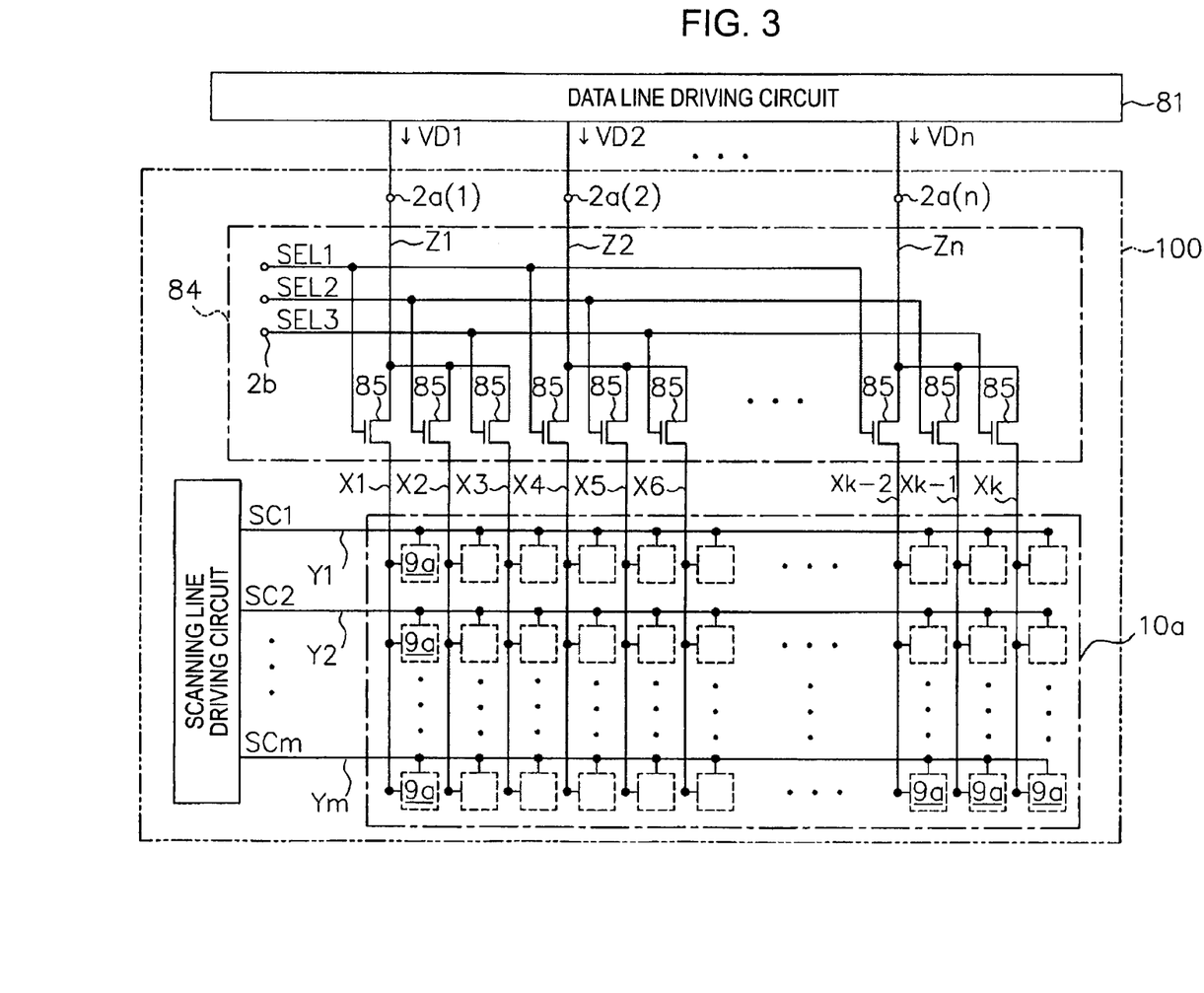
FIG. 3 is a block diagram illustrating the structure of an electro-optical device according to the first embodiment.

First, the structure of the electro-optical device will be described with reference to FIGS. 1 to 3. FIG. 1 is a plan view of the electro-optical panel having a TFT array substrate and components formed thereon, as viewed from a counter substrate. FIG. 2 is a cross-sectional view taken along the line II-II of FIG. 1, and FIG. 3 is a view illustrating the structure of the electro-optical device according to the present embodiment.

In FIGS. 1 and 2, in an electro-optical panel 100, a TFT array substrate 10 and a counter substrate 20 are arranged opposite to each other. A liquid crystal layer 50 is sealed between the TFT array substrate 10 and the counter substrate 20. The TFT array substrate 10 and the counter substrate 20 are made of, for example, quartz or glass, and are bonded to each other by a sealing material 52 provided in a sealing region around an image display region 10a.

The sealing material 52 is made of, for example, an ultraviolet ray curable resin or thermosetting resin for bonding the two substrates. In a manufacturing process, the sealing material is coated on the TFT array substrate 10 and is then cured by irradiation with ultraviolet rays or by heating. Gap members, such as glass beads or glass fiber, are provided in a space between the TFT array substrate 10 and the counter substrate 20 sealed by the sealing material 52 to maintain a gap (that is, an inter-substrate gap) between the TFT array substrate 10 and the counter substrate 20 to be uniform.

The image display region 10a for displaying images is provided at the center of the inside of the substrate. In a peripheral region of the image display region 10a, two scanning line driving circuits 104 are provided along two sides of the image display region 10a, respectively, and a demultiplexer 84 is provided along a lower side thereof.

Furthermore, in the outside of the sealing region, external circuit connecting terminals 2 are provided along one side of the TFT array substrate 10. The external circuit connecting terminals 2 are connected to wiring lines extending from the sealing region, respectively. Here, the external circuit connecting terminal 2 includes image signal terminal 2a for supplying image signals and selection signal terminals 2b for supplying selection signals (which will be described below).

Further, vertical connection members 106 for electrically connecting both substrates are arranged at four corners of the counter substrate 20. On the other hand, vertical connection members are provided in regions of the TFT array substrate 10 opposite to the corners. Thus, the TFT array substrate 10 and the counter substrate 20 can be electrically connected to each other.

In FIG. 2, on the TFT array substrate 10, pixel electrodes 9a are formed on pixel switching TFTs and various wiring lines, and an alignment film is formed thereon. On the other hand, a counter electrode 21 is formed on the counter substrate 20, and an alignment film is formed thereon. Also, the liquid crystal layer 50 is composed of one kind of nematic liquid crystal or liquid crystal obtained by mixing several kinds of nematic liquid crystal, and the liquid crystal is arranged between a pair of alignment films in a predetermined alignment stage.

Moreover, the TFT array substrate 10 may be provided with, for example, a pre-charge circuit for supplying pre-charge signals having a predetermined voltage to a plurality of data lines prior to image signals and a test circuit for evaluating the quality and testing for defects of the electro-optical panel 100 during manufacture or prior to shipping, in addition to the scanning line driving circuits 104 and the demultiplexer 84.

In FIG. 3, in the image display region 10a of the electro-optical panel 100, a plurality of scanning lines Y1 to Ym and a plurality of data lines X1 to Xk are arranged so as to be perpendicular to each other, and the pixel electrodes 9a selected by the scanning lines Y1 to Ym and the data lines X1 to Xk are provided corresponding to intersections thereof. Further, although not shown, active matrix driving pixel switching elements and storage capacitors are formed in the image display region 10a in correspondence with the pixel electrodes 9a. The scanning lines Y1 to Ym are connected to the scanning line driving circuit 104, and scanning signals SC1, SC2, . . . , SCm are line-sequentially applied to the scanning lines by the scanning line driving circuit 104.

In the electro-optical panel 100, the data line driving circuit 81 is electrically connected to the plurality of image signal terminals 2a. Here, the data line driving circuit 81 supplies multiplex signals VD1, VD2, . . . , VDn to the image signal terminals 2a(1), 2a(2), . . . , 2a(n), respectively. The multiplex signals VD1, VD2, . . . , VDn are obtained by multiplexing R, G, and B image signals forming one pixel along the time axis.

The demultiplexer 84 includes switching elements 85 respectively corresponding to the data lines X1 to Xk. Each of the switching elements 85 is formed of an N-type FET, and a drain thereof is connected to the corresponding image signal line. In addition, a source thereof is connected to each of the data lines X1 to Xk. Here, among the data lines X1 to Xk, three data lines constitute a group, and the switching elements 85 corresponding to each group (which is composed of three data lines) are connected to the image signal lines Z1, Z2, . . . , Zn, respectively. Also, in each group of switching elements 85, selection signals SEL1, SEL2, and SEL3 are input to gates of the switching elements 85 respectively.

The selection signals SEL1, SEL2, and SEL3 are input from the outside through the selection signal terminals 2b. The waveforms of the selection signals SEL1, SEL2, and SEL3 are set to time-divisionally drive each group of switching elements 85.

That is, the demultiplexer 84 having the above-mentioned structure demultiplexes the multiplex signals input through the plurality of image signal terminals 2b according to the selection signals SEL1, SEL2, and SEL3, and outputs three types of image signals obtained by the demultiplexing to three data lines, respectively.

The electro-optical panel 100 is a hybrid type, and has relatively many image signal terminals 2a. The number of image signal terminals 2a must be at least a third of the number of data lines X1 to Xk (that is, the number of pixels in the horizontal direction), that is, several hundreds of image signal terminals are used in practice. This number is considerably larger than the number (several or several tens) of image signal terminals of the electro-optical device which is driven by serial-parallel expansion (that is, phase expansion). Further, since the number of image signal terminals 2a is large, a gap between the terminals is relatively narrow.

Electro-Optical Device Substrate

Figure 4:
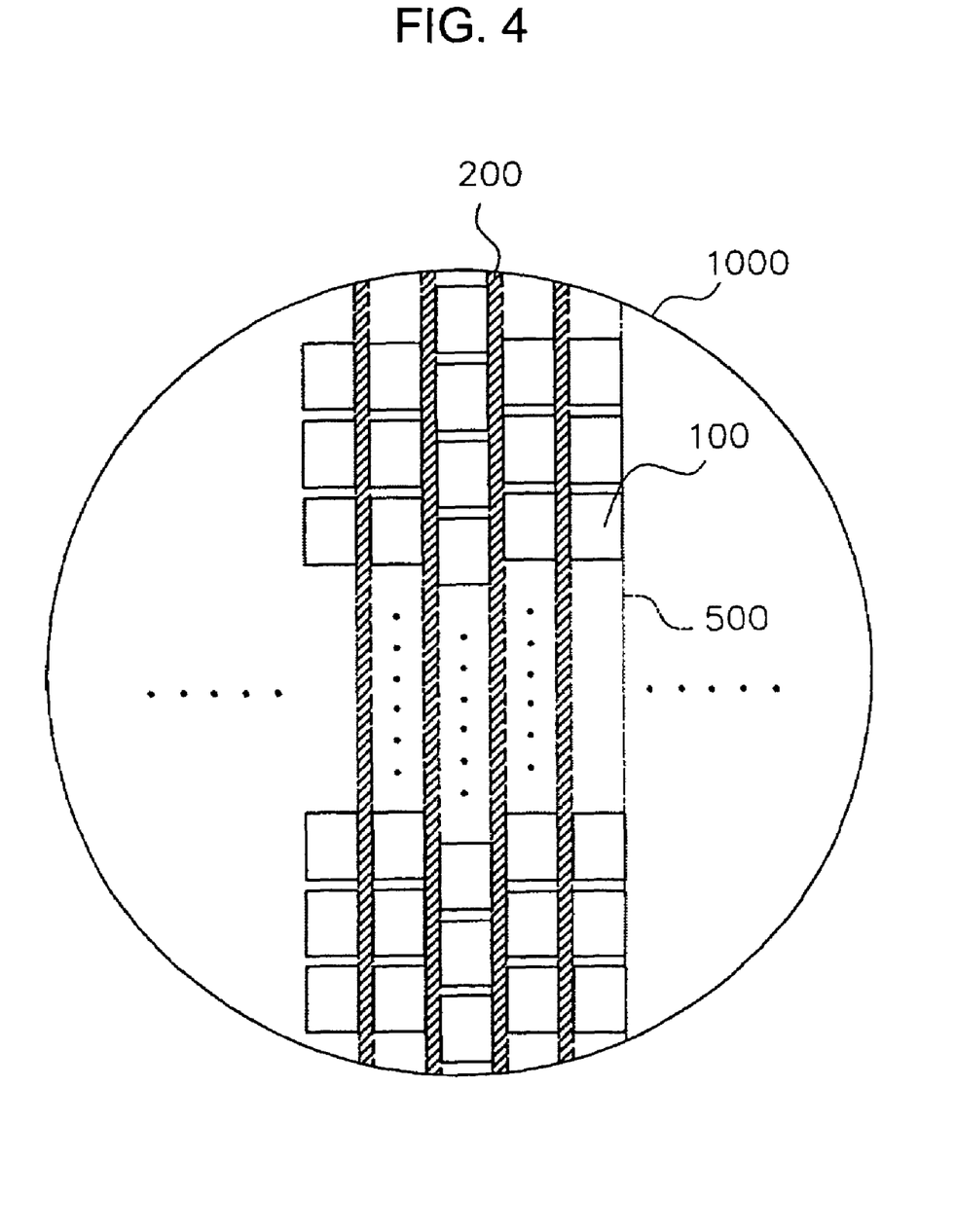
FIG. 4 is a plan view schematically illustrating the structure of an electro-optical device substrate according to the first embodiment.
Figure 5:
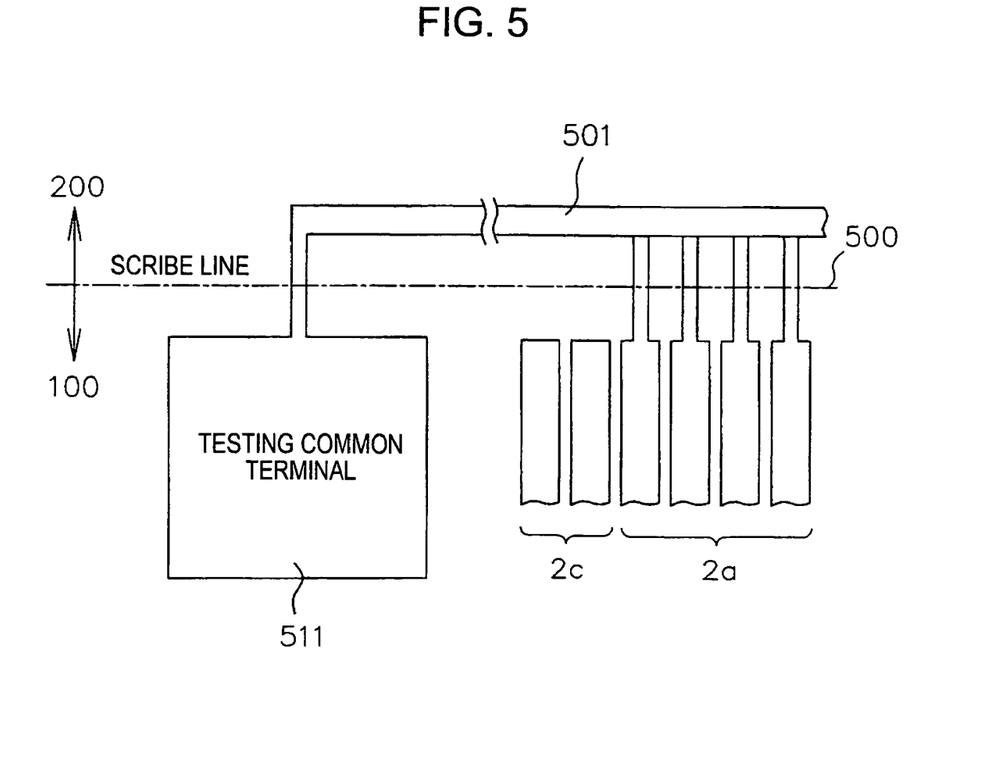
FIG. 5 is an enlarged partial plan view illustrating the structure of main parts of FIG. 4.

Next, an electro-optical device substrate according to the present embodiment will be described with reference to FIGS. 4 and 5. FIG. 4 schematically illustrates the structure of the electro-optical device substrate according to the present embodiment, and FIG. 5 illustrates the structure of the main parts thereof.

In FIG. 4, regions where a plurality of electro-optical panels are formed are defined on an electro-optical device substrate 1000, which is a mother board, and the electro-optical panels 100 are formed in the regions, respectively. That is, the elector-optical device substrate 1000 corresponds to the TFT array substrates 10 of the electro-optical panels 100.

The substrate 1000 is divided into strip-shaped pieces each composed of a plurality of electro-optical panels 100 along scribe lines, and then each strip-shaped piece is divided into a plurality of electro-optical panels 100. Hatched scribe spaces 200 are provided between rows of electro-optical panels 100 of the electro-optical device substrate 1000. The scribe spaces 200 are provided on the outsides of the electro-optical panels 100, using the scribe lines 500 as boundaries, to absorb a dimension error occurring when the electro-optical device substrate 1000 is divided. The scribe spaces 200 are separated from the electro-optical panels 100 along the scribe lines 500 when the electro-optical device substrate 1000 is divided into strip-shaped pieces.

In the electro-optical device substrate 1000, a testing wiring line 501 (not shown in this embodiment) for commonly connecting the image signal terminals 2a is formed in the scribe space 200.

In FIG. 5, a plurality of external circuit connecting terminals 2 are arranged in the vicinity of the edge of the electro-optical panel 100. The external connecting terminals 2 include terminals for receiving signals from external circuits, such as power supply terminals terminal and terminals for supplying signals, such as timing control signals from the scanning line driving circuit, in addition to the image signal terminals 2a and the selection signal terminals 2b. Accordingly, the external circuit connecting terminals 2 other than the image signal terminals 2a are generically called driving signal terminals 2c.

Several or all of the image signal terminals 2a are commonly connected to the testing wiring line 501 in the scribe space 200 by wiring lines crossing the scribe line 500. In other words, all the image signal terminals 2a may not be necessarily connected to the testing wiring line 501. Alternatively, the image signal terminals 2a may be divided into several groups, and the groups of image signal terminals 2a may be connected to different testing wiring lines 501.

An end of the testing wiring line 501 is connected to a testing common terminal 511. The testing common terminal 511 is adequately formed in an empty space beside the external circuit connecting terminals 2. Here, the testing common terminal 511 is formed to have a larger size than the external circuit connecting terminal 2.

Also, the testing wiring line 501 and the testing common terminal 511 may be formed of the same film as the external circuit connecting terminal 2 or the image signal line. In this case, the number of forming processes is not increased. Also, it is not necessary to secure a wiring space in the electro-optical panel 100, or to change the layout therefor. The operations and effects of the testing wiring line 501 and the testing common terminal 511 will be described later.

Method of Testing Electro-Optical Panel

Figure 6:
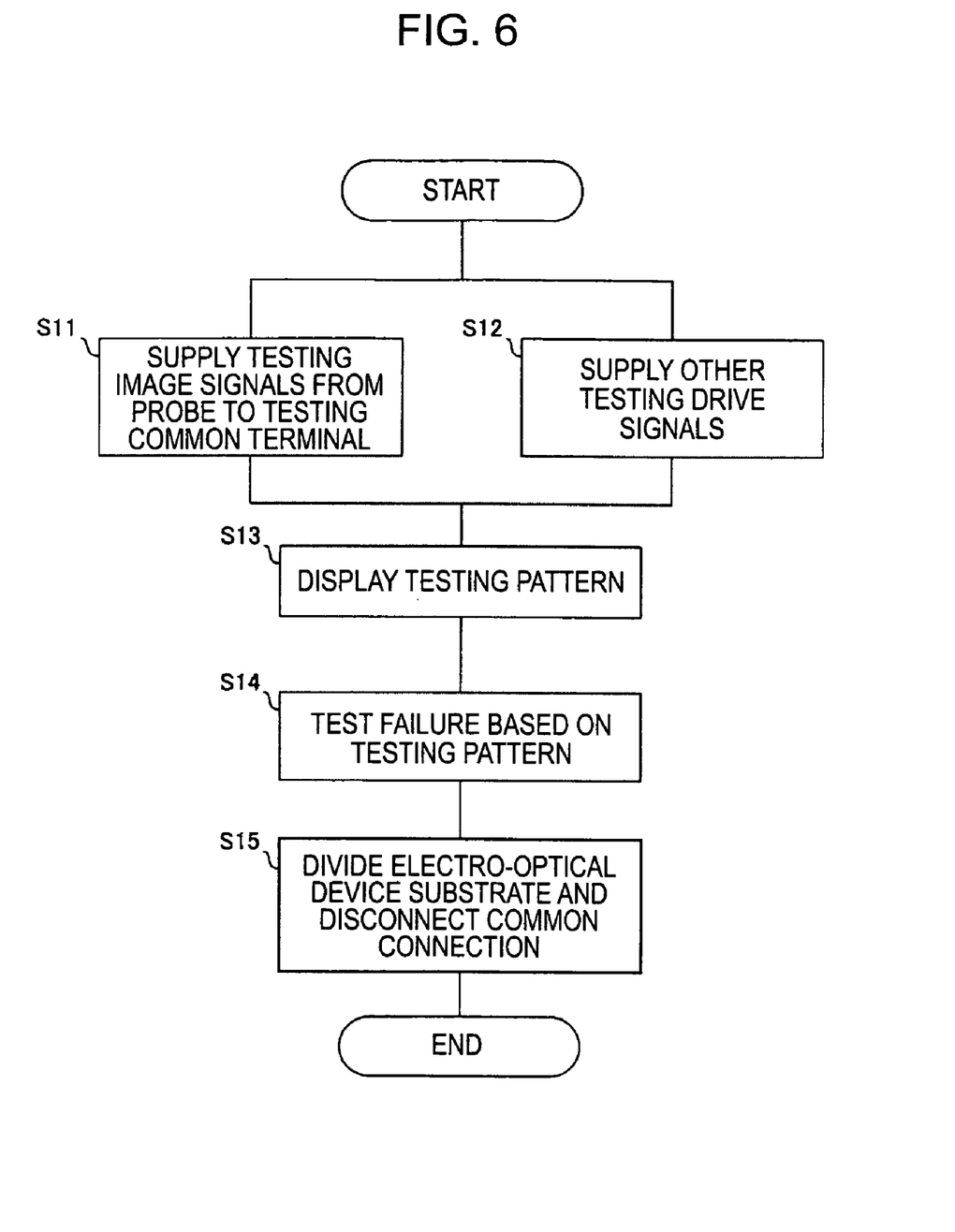
FIG. 6 is a flowchart illustrating a method of testing the electro-optical panel according to the first embodiment.

The above-mentioned electro-optical panel 100 is tested for failure due to the forming process before it is divided from the electro-optical device substrate 1000. Hereinafter, the method of testing the electro-optical panel 100 will be described with reference to FIGS. 1 to 5 and FIG. 6. FIG. 6 is a flowchart illustrating a method of testing the electro-optical panel according to the present embodiment.

In the flowchart shown in FIG. 6, first, a testing image signal is supplied from a probe to the testing common terminal 511 (step S11). Here, the testing signal is collectively supplied to the plurality of image signal terminals 2a commonly connected to the testing common terminal 511 by bringing the probe into contact with the testing common terminal 511 having a relatively large area. Thus, location precision required for the testing probe can be reduced.

In general, the testing signal is supplied by bringing the probe into contact with each of the image signal terminals. However, since the number of image signal terminals 2a is very large and the pitch therebetween is narrow as mentioned above, it is difficult to accurately perform the test using this method. Accordingly, this method requires high location precision for the probe. On the contrary, in this embodiment, the image signal terminals 2a are connected to the testing wiring line 501, which causes the pitch between the terminals to be widened. In addition, the testing common terminal 511 having a relatively large area is arranged in a predetermined region, which causes the contact area of the probe to be increased. Accordingly, the probe can be easily positioned. Thus, in this embodiment, the testing image signals can be simply and accurately supplied to the image signal terminals 2a.

Further, testing drive signals other than the image signals are supplied to the electro-optical panel 100 (step S12). The electro-optical panel 100 to be tested is driven on the electro-optical device substrate 1000 to display a test pattern on the image display region 10a (step S13).

Subsequently, defects of the electro-optical panel 100 are tested by monitoring the signal waveforms of a predetermined part of the electro-optical panel 100 when the test pattern is generated, or by viewing the test pattern (step S14). In other words, the test is performed based on the driving state of the electro-optical panel 100 represented by these monitoring results.

Furthermore, when the testing image is displayed to detect the defects according to the suitability, it is not necessary to efficiently perform the test with the naked eye of a testing person, without incorporating the testing circuit into the electro-optical panel 100.

After the test, the electro-optical device substrate 1000 is divided along the scribe lines 500. At this time, the testing wiring lines 501, the image signal terminals 2a, and the testing common terminals 511 are disconnected from each other along the scribe lines 500 serving as the boundaries therebetween (step S15). Accordingly, the testing wiring lines 501 are used only during test, and do not affect the electro-optical panels 100 after the division.

As mentioned above, according to the present embodiment, although the electro-optical panel 100 formed on the electro-optical device substrate 1000 is of a hybrid type, the location precision required for the probe for supplying the image signal during the test is not so high. Accordingly, it is possible to prevent an increase in testing costs, and to simply and accurately perform a test.

Hereinafter, the other embodiments of the invention will be described with reference to FIGS. 7 to 10. Moreover, in the following embodiments, the same components as those in the first embodiment have the same reference numerals, and thus a description thereof will be omitted.

Second Embodiment

Figure 7:
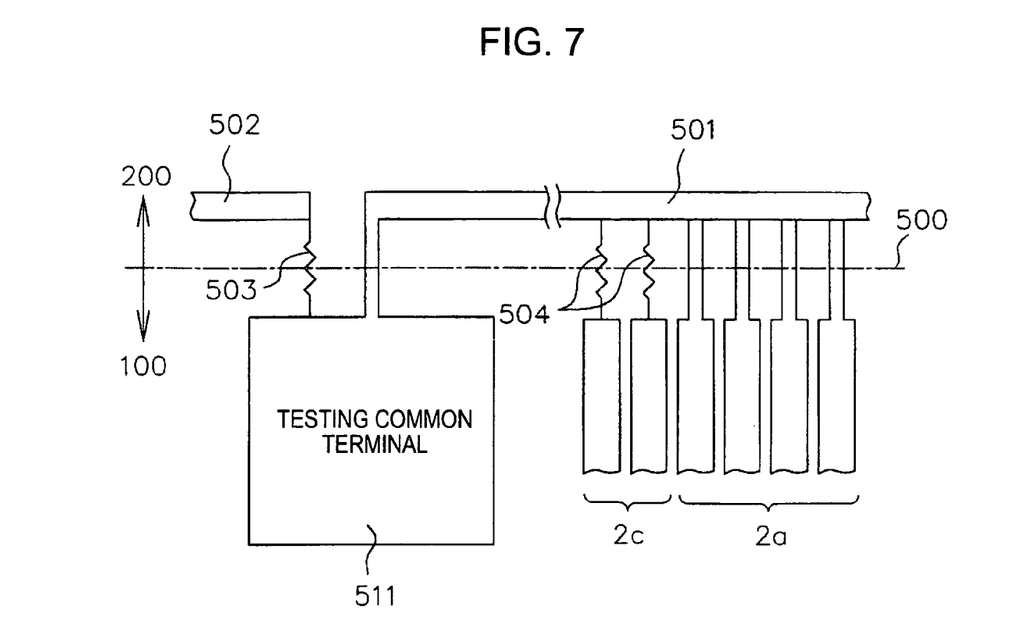
FIG. 7 is a partial plan view illustrating the structure of the main parts of an electro-optical device substrate according to a second embodiment.

Next, a second embodiment will be described with reference to FIG. 7. FIG. 7 corresponds to FIG. 5 of the first embodiment, and is a partial plan view illustrating the structure of the main parts of an electro-optical device substrate according to the present embodiment.

In FIG. 7, a guard ring 502 is formed in the scribe space 200, and is connected to the testing common terminal 511 through a high-resistance wiring line 503. The guard ring 502 is provided to prevent the convergence of an electric field at a circuit part of the electro-optical panel 100, and the resistance value of the high-resistance wiring line 503 is set to be larger than 1 MΩ.

Here, all the commonly connected image signal terminals 2a are connected to the guard ring 502 by the connection of the testing common terminal 511. Thus, transistors connected to the image signal terminals 2a, specifically, pixel switching elements interposed between the switching element 85 or the data lines X1 to Xk and the pixel electrodes 9a can be efficiently prevented from being damaged by static electricity generated in a process of forming the electro-optical panel 100 or an assembling process of bonding to the counter substrate 20.

Furthermore, the driving signal terminals 2c are connected to the testing wiring line 501 through high-resistance wiring lines 504, respectively. The resistance value of the high-resistance wiring line 504 is set to be larger than 1 MΩ. That is, the testing wiring line 501 also serves as a guard ring. As a result, transistors connected to the external circuit connecting terminals 2 other than the image signal terminals 2a can be efficiently prevented from being damaged by the static electricity. Further, the other operations and effects are the same as those of the first embodiment.

Third Embodiment

Figure 8:
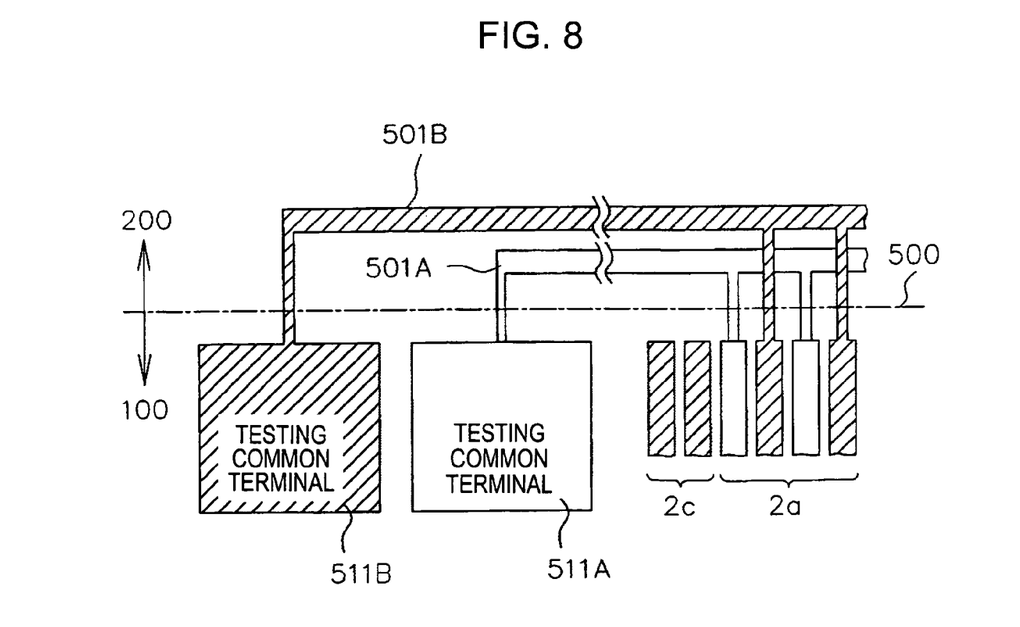
FIG. 8 is a partial plan view illustrating the structure of main parts of an electro-optical device substrate according to a third embodiment.

Next, a third embodiment will be described with reference to FIG. 8. FIG. 8 corresponds to FIG. 5 of the first embodiment, and is a partial plan view illustrating the structure of the main parts of an electro-optical device substrate according to the present embodiment.

In FIG. 8, two types of testing wiring lines are respectively connected to the testing common terminals. The image signal terminals 2a are be divided into a group of odd-numbered image signal terminals and a group of even-numbered image signal terminals, the two groups are connected to testing wiring lines 501A and 501B and testing common terminals 511A and 511B, respectively.

The testing image signals are transmitted to the image signal terminals 2a through two wiring lines, and thus it is possible to improve the freedom of the display pattern. For example, if 8-phase demultiplex driving is performed during the test, the same image signal is applied to eight data lines of the data lines X1 to Xk, and thus the pattern having the width corresponding thereto is displayed in the structure of the first embodiment. However, pattern display can be performed for every 16 data lines in this embodiment. Also, the other operations and effects of this embodiment are the same as those of the first embodiment.

Fourth Embodiment

Figure 9:
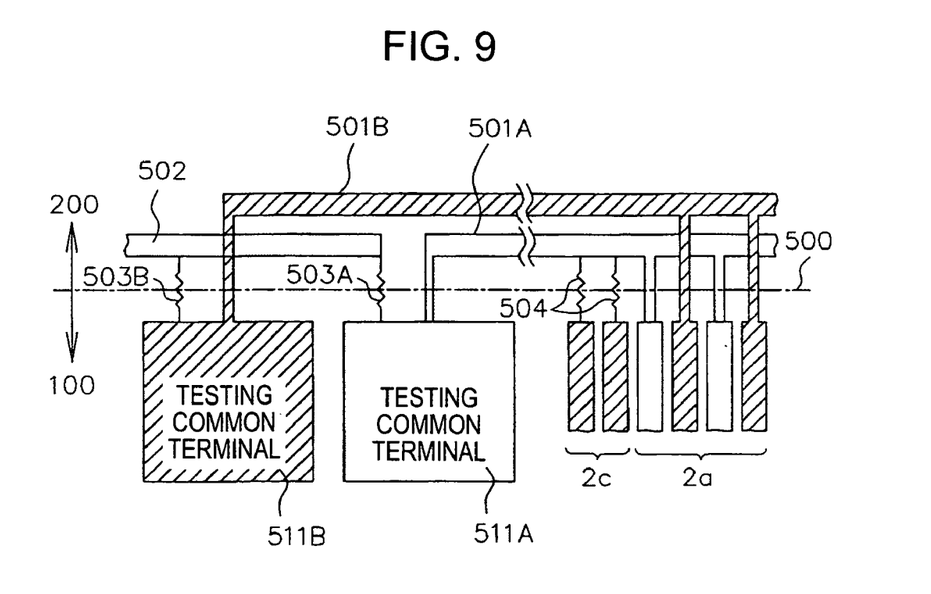
FIG. 9 is a partial plan view illustrating the structure of main parts of an electro-optical device substrate according to a fourth embodiment.

Next, a fourth embodiment will be described with reference to FIG. 9. FIG. 9 corresponds to FIG. 5 of the first embodiment, and is a partial plan view illustrating the structure of the main parts of an electro-optical device substrate according to the present embodiment.

In FIG. 9, an electro-optical panel according to the present embodiment has a combined structure of the second embodiment and the third embodiment. In this case, in addition to the operations and the effects of the second embodiment and the third embodiment, the following operations and effects can be obtained. In other words, phase-adjacent image signal terminals 2a are connected to a guard ring 502 to be connected to high-resistance testing wiring lines 501A and 501B. In this way, it is possible to reduce the affection of the static electricity generated between the image signal terminals 2a.

Fifth Embodiment

Figure 10:
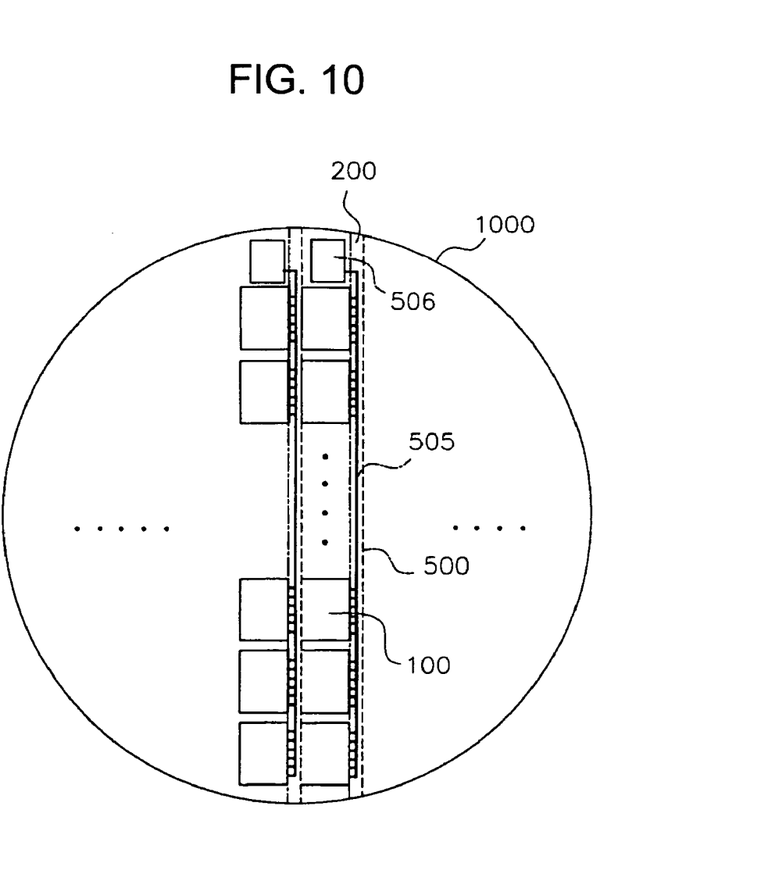
FIG. 10 is a plan view schematically illustrating the structure of an electro-optical device substrate according to a fifth embodiment.

Next, a fifth embodiment will be described with reference to FIG. 10. FIG. 10 is a plan view schematically illustrating the structure of an electro-optical device substrate according to the present embodiment.

In FIG. 10, a plurality of electro-optical panels 100 are arranged on the electro-optical device substrate 1000 along the scribe lines 500. Also, in the scribe spaces 200, testing wiring lines 505 are formed so as to extend along the electro-optical panels 100.

The image signal terminals 2a of the electro-optical panel 100 are commonly connected to the testing wiring line 505. That is, the testing wiring line 505 is not electrically connected to only one electro-optical panel 100, but is electrically connected to a plurality of electro-optical panels 100 formed on the same electro-optical device substrate 1000. Also, a testing common terminal 506 is provided at an end of each testing wiring line 505. Also, specifically, for example, these components may be connected to each other as described in the first to fourth embodiments.

Thus, in the present embodiment, the same test can be simultaneously performed on the plurality of electro-optical panels 100, and thus it is possible to improve manufacturing efficiency. After the test, the plurality of electro-optical panels 100 are physically divided as a separate chip, and thus the common electrical connection to the testing wiring line 505 is broken. Accordingly, any problem does not arise.

The electro-optical device described above in detain can be applied to various electronic apparatuses, such as a mobile personal computer, a cellular phone, and a digital camera. As an example, a personal computer is shown in FIG. 11.

Figure 11:
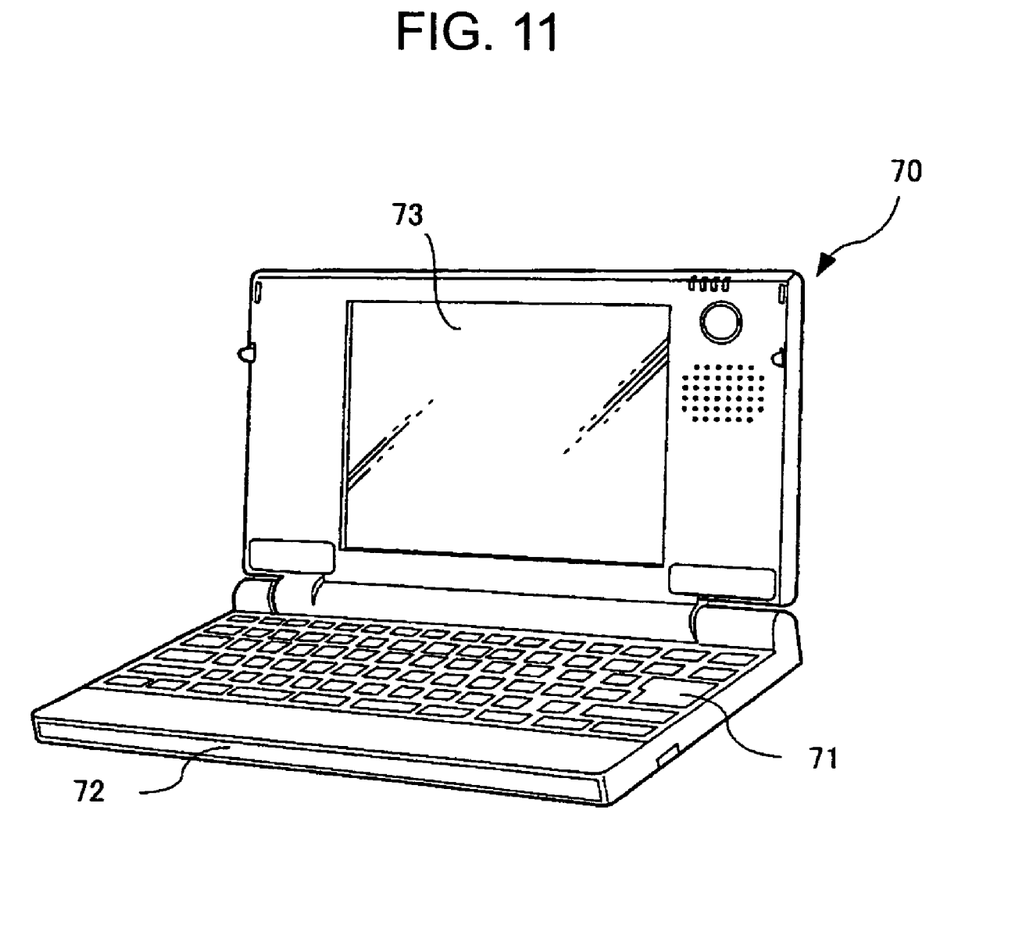
FIG. 11 is a perspective view illustrating a personal computer as an example of an electronic apparatus to which the electro-optical device according to the invention is applied.

In FIG. 11, a personal computer 70 includes a main body 72 having a keyboard 71 and a display unit 73 composed of a liquid crystal monitor. The electro-optical device according to the above-described embodiments is applied to the display unit 73.

Accordingly, a test for the electro-optical panels 100 is simply and accurately performed before the electro-optical device substrate 1000 is divided, and thus it is possible to improve manufacturing efficiency.

The invention is not limited to the above-described embodiments, and can be changed without departing from the spirit and scope of the invention as defined by the following claims. Also, of course, an electro-optical device substrate according to the modifications and changes, electro-optical devices manufactured from the electro-optical device substrate, and a method of testing the electro-optical devices can also be included in the scope of the invention.

What is claimed is:

1. An electro-optical device substrate that has substrate devices, each composed of at least a portion of an electro-optical device having an image display region, on a surface thereof, and that is divided into the substrate devices along boundaries between regions where the substrate devices are formed, comprising:
   a plurality of data line groups each of which is composed of n (where n is a natural number equal to or greater than 2) data lines, and which are formed in the image display region of each substrate device forming region;
   a plurality of image signal terminals which are formed in a peripheral region of the image display region of each substrate device forming region to correspond to the plurality of data line groups, respectively, and which are respectively supplied with multiplex signals of the data line groups obtained by multiplexing n types of image signals along a time axis;
   a demultiplexer which is formed in the peripheral region of the image display region in each substrate device forming region, and which demultiplexes the multiplex signals input through the plurality of image signal terminals according to selection signals to generate and output the n types of image signals to the n data lines, respectively;
   driving signal terminals which are formed in the peripheral region of the image display region in each substrate device forming region, and which are supplied with driving signals including the selection signals; and
   testing wiring lines which are provided in regions other than the substrate device forming regions on the substrate, and which are respectively supplied with testing signals for the substrate devices, two or more image signal terminals being electrically connected to each testing wiring line.

2. The electro-optical device substrate according to claim 1, further comprising:
   a testing common terminal which is formed in the peripheral region to be electrically connected to the testing wiring line, so that it is supplied with the testing signals.

3. The electro-optical device substrate according to claim 1, further comprising:
   a testing common terminal which is formed in the region other than the substrate device forming region to be electrically connected to the testing wiring line, so that it is supplied with the testing signals.

4. The electro-optical device substrate according to claim 2, wherein the size of the testing common terminal is larger than that of the image signal terminal on the substrate.

5. The electro-optical device substrate according to claim 1, further comprising:
   a guard ring which is formed in the region other than the substrate device forming region to be electrically connected to the testing wiring line through a high-resistance wiring line having a resistance value of larger than 1 MΩ.

6. The electro-optical device substrate according to claim 1,
wherein the driving signal terminals are electrically connected to the testing wiring line through high-resistance wiring lines having a resistance value of larger than 1 MΩ, respectively.

7. The electro-optical device substrate according to claim 1,
wherein the plurality of image signal terminals are divided into a plurality of groups, and a plurality of testing wiring lines are formed to be electrically connected to the groups of image signal terminals, respectively.

8. The electro-optical device substrate according to claim 7,
wherein the testing wiring lines are electrically connected to a group of odd-numbered image signal terminals and a group of odd-numbered image signal terminals, respectively.

9. The electro-optical device substrate according to claim 1,
wherein the substrate devices are arranged on the substrate, and the testing wiring lines commonly and electrically connect the plurality of image signal terminals of the substrate devices, respectively.

10. The electro-optical device substrate according to claim 1,
wherein the image display region of each substrate device forming region is provided with a plurality of scanning lines intersecting the data lines and a plurality of pixel units which are respectively provided corresponding to intersections of the data lines and the scanning lines, and
the peripheral region is provided with a scanning line driving circuit that respectively outputs the scanning signals to the plurality of scanning lines.

11. An electro-optical device comprising:
the substrate device which is obtained by dividing the electro-optical device substrate according to claim 1 along the boundaries between the substrate device forming regions;
an image signal supplying unit that generates multiplex signals by multiplexing the n types of image signals along the time axis to supply them to the plurality of image signal terminals; and
a driving signal supplying unit that supplies the driving signals to the driving signal terminals.

12. A method of testing a substrate device used for an electro-optical device substrate that has the substrate devices, each composed of at least a portion of an electro-optical device having an image display region, on a surface thereof, and that is divided into the substrate devices along boundaries between regions where the substrate devices are formed,
the electro-optical device substrate including:
a plurality of data line groups each of which is composed of n (where n is a natural number equal to or greater than 2) data lines, and which are formed in the image display region of each substrate device forming region;
a plurality of image signal terminals which are formed in a peripheral region of the image display region of each substrate device forming region to correspond to the plurality of data line groups, respectively, and which are respectively supplied with multiplex signals of the data line groups obtained by multiplexing n types of image signals along a time axis;
a demultiplexer which is formed in the peripheral region of the image display region in each substrate device forming region, and which demultiplexes the multiplex signals input through the plurality of image signal terminals according to selection signals to generate and output the n types of image signals to the n data lines, respectively;
driving signal terminals which are formed in the peripheral region of the image display region in each substrate device forming region, and which are supplied with driving signals including the selection signals; and
testing wiring lines which are provided in regions other than the substrate device forming regions on the substrate, and which are respectively supplied with testing signals for the substrate devices, two or more image signal terminals being electrically connected to each testing wiring line, and
the method comprising:
supplying the testing signals to the image signal terminals through the testing wiring lines to drive the substrate devices; and
performing the testing based on driving states of the substrate devices.

* * * * *

UNITED STATES PATENT AND TRADEMARK OFFICE
CERTIFICATE OF CORRECTION

PATENT NO. : 7,633,469 B2 Page 1 of 1
APPLICATION NO. : 11/201179
DATED : December 15, 2009
INVENTOR(S) : Hirotaka Kawata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Ninth Day of November, 2010

David J. Kappos
*Director of the United States Patent and Trademark Office*